United States Patent
Nguyen et al.

(10) Patent No.: US 8,960,284 B2
(45) Date of Patent: Feb. 24, 2015

(54) METHODS OF HINDERING THE SETTLING OF PROPPANT AGGREGATES

(75) Inventors: Philip D. Nguyen, Houston, TX (US); Jonathan Dale Worley, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 276 days.

(21) Appl. No.: 13/597,502

(22) Filed: Aug. 29, 2012

(65) Prior Publication Data

US 2014/0060827 A1 Mar. 6, 2014

(51) Int. Cl.
*E21B 43/267* (2006.01)
(52) U.S. Cl.
CPC .................................. *E21B 43/267* (2013.01)
USPC ...................... 166/271; 166/280.1; 166/308.1
(58) Field of Classification Search
CPC ................................ E21B 43/267; C09K 8/80
USPC ............. 166/271, 280.1, 308.1, 308.3, 308.4, 166/302.2, 308.6
See application file for complete search history.

(56) References Cited

U.S. PATENT DOCUMENTS

| | | | |
|---|---|---|---|
| 4,585,064 A | 4/1986 | Graham et al. | |
| 4,670,501 A | 6/1987 | Dymond et al. | |
| 4,733,729 A | 3/1988 | Copeland | |
| 4,777,154 A | 10/1988 | Torobin | |
| 4,850,430 A | 7/1989 | Copeland et al. | |
| 4,969,523 A | 11/1990 | Martin et al. | |
| 5,249,627 A | 10/1993 | Harms et al. | |
| 5,531,274 A | 7/1996 | Bienvenu, Jr. | |
| 5,833,000 A | 11/1998 | Weaver et al. | |
| 5,839,510 A | 11/1998 | Weaver et al. | |
| 1,853,048 A | 12/1998 | Weaver et al. | |
| 5,905,061 A | 5/1999 | Patel | |
| 5,977,031 A | 11/1999 | Patel | |
| 6,287,639 B1 | 9/2001 | Schmidt et al. | |
| 6,311,773 B1 | 11/2001 | Todd et al. | |
| 6,439,309 B1 | 8/2002 | Matherly et al. | |
| 6,582,819 B2 | 6/2003 | McDaniel et al. | |
| 6,677,426 B2 | 1/2004 | Noro et al. | |
| 6,828,279 B2 | 12/2004 | Patel et al. | |
| 7,153,575 B2 | 12/2006 | Anderson et al. | |
| 7,281,580 B2 | 10/2007 | Parker et al. | |
| 7,392,847 B2 | 7/2008 | Gatlin et al. | |
| 7,534,745 B2 | 5/2009 | Taylor et al. | |
| 7,645,723 B2 | 1/2010 | Kirsner et al. | |
| 7,673,686 B2 | 3/2010 | Nguyen et al. | |
| 7,696,131 B2 | 4/2010 | Oyler et al. | |
| 7,772,163 B1 | 8/2010 | Brannon et al. | |
| 7,819,192 B2 | 10/2010 | Weaver et al. | |
| 7,825,074 B2 | 11/2010 | Schmidt et al. | |
| 7,956,017 B2 | 6/2011 | Gatlin et al. | |
| 8,003,579 B2 | 8/2011 | Akarsu et al. | |
| 2005/0274517 A1 | 12/2005 | Blauch et al. | |
| 2005/0277554 A1 | 12/2005 | Blauch et al. | |
| 2006/0180308 A1 | 8/2006 | Welton et al. | |
| 2006/0180309 A1 | 8/2006 | Welton et al. | |
| 2006/0181310 A1 | 8/2006 | Rhee | |
| 2006/0183646 A1 | 8/2006 | Welton et al. | |
| 2007/0131422 A1 | 6/2007 | Gatlin et al. | |
| 2007/0131425 A1 | 6/2007 | Gatlin et al. | |
| 2007/0289781 A1 | 12/2007 | Rickman et al. | |
| 2008/0006405 A1 | 1/2008 | Rickman et al. | |
| 2008/0261837 A1 * | 10/2008 | Usova et al. | 507/264 |
| 2010/0089581 A1 | 4/2010 | Nguyen et al. | |
| 2010/0160187 A1 | 6/2010 | Nguyen et al. | |
| 2010/0212898 A1 | 8/2010 | Nguyen et al. | |
| 2011/0030950 A1 | 2/2011 | Weaver et al. | |
| 2011/0039737 A1 | 2/2011 | Schmidt et al. | |
| 2011/0067868 A1 | 3/2011 | Le Roy-Delage et al. | |
| 2011/0120719 A1 * | 5/2011 | Soane et al. | 166/308.1 |
| 2014/0020893 A1 * | 1/2014 | Smith et al. | 166/280.2 |

* cited by examiner

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Providing a carrier fluid having a density; providing a proppant aggregates having a density higher than that of the carrier fluid; and, providing low-density particulates having a density lower than that of the carrier fluid. Then the carrier fluid, proppant aggregates, and low-density particulates are combined to create a propping fluid. The propping fluid then is placed into a fracture within a subterranean formation wherein the low-density particulates slow the settling of the proppant aggregates within the fracture.

17 Claims, No Drawings

METHODS OF HINDERING THE SETTLING OF PROPPANT AGGREGATES

BACKGROUND

The present invention relates to fracturing operations and, more particularly to, methods of hindering the settling of proppant aggregates once placed into a fracture.

Various methods are known for fracturing a subterranean formation to enhance the production of fluids. In a hydraulic fracturing operation, a pressurized fracturing fluid can be used to hydraulically create and propagate a fracture within the subterranean formation. Fracturing fluids can also carry and deposit solids such as proppants into the fracture. Inside the fracture, the proppants can form a tightly packed permeable mass (sometimes referred to as a "proppant pack"). The proppant pack serves as a physical barrier that prevents the fracture from fully closing and as a conduit through which production fluids can flow. The degree of success of a fracturing operation depends, at least in part, upon the fracture conductivity once the fracturing operation is stopped and production is begun. The conductivity of these proppant packs are somewhat limited because of the relatively small interconnected interstitial spaces between the packed proppant.

Another fracturing approach involves placing a much reduced volume of proppants in a fracture in order to create a high porosity fracture. In such operations, the proppant particulates within the fracture may be widely spaced but still sufficient to hold the fracture open and allow for production fluids to flow. Increased fracture conductivity may result due to the fact that the produced fluids may flow around widely spaced proppant rather than through the relatively small interstitial spaces in a proppant pack. While this fracturing concept has been investigated in the industry, its widespread usefulness is still somewhat limited for a number of reasons. Among other things, settling of proppant can be particularly problematic when reduced volumes of proppants. Proppant settling may lead to a fracture or a top portion of a fracture closing, which can lower the conductivity of the propped fracture and result in proppant aggregation, rather than discrete proppant pillars. Proppant settling may be particularly problematic in cases where proppant aggregates are used in place of traditional proppant because the proppant aggregates tend to be larger and may be heavier and thus are more difficult to hold suspended. While settling may be counteracted by using a high pump rate or by increasing the viscosity of the fluid carrying the proppant or aggregates, such methods often lose effectiveness once the fluid is placed into a fracture and before the fracture pressure is released.

SUMMARY OF THE INVENTION

The present invention relates to fracturing operations and, more particularly to, methods of hindering the settling of proppant aggregates once placed into a fracture.

Some embodiments of the present invention provide methods comprising: providing a carrier fluid having a density; providing a proppant aggregates having a density higher than that of the carrier fluid; and providing low-density particulates having a density lower than that of the carrier fluid. The carrier fluid, proppant aggregates, and low-density particulates are combined to create a propping fluid. That propping fluid is then placed into a fracture within a subterranean formation wherein the low-density particulates slow the settling of the proppant aggregates within the fracture.

Some embodiments of the present invention provide methods comprising: providing a carrier fluid having a density between about 0.75 g/cm$^3$ and 1.25 g/cm$^3$; providing a proppant aggregates having a density above 1.1 g/cm$^3$; providing low-density particulates having a density below 0.95 g/cm$^3$. The carrier fluid, proppant aggregates, and low-density particulates are combined to create a propping fluid that is placed into a fracture within a subterranean formation; wherein the low-density particulates slow the settling of the proppant aggregates within the fracture.

The features and advantages of the present invention will be readily apparent to those skilled in the art upon a reading of the description of the preferred embodiments that follows.

DETAILED DESCRIPTION

The present invention relates to fracturing operations and, more particularly to, methods of hindering the settling of proppant aggregates once placed into a fracture.

The present invention provides methods of increasing the ability of proppant aggregates to remain suspended within a treatment fluid, and may be particularly well suited to achieve that goal once the treatment fluid has been placed into a subterranean fracture. In methods of the present invention, a treatment fluid comprising proppant aggregates and low-density particulates is placed within a fracture in a subterranean formation. Generally, once placed inside the fracture, the proppant aggregates tend to settle, separate, and consolidate toward the bottom of the fracture. This is particularly true where the proppant aggregates have a density greater than the density of the treatment fluid. However, in the methods of the present invention, as the proppant aggregates attempt to fall toward the bottom of the fracture, they encounter low-density particulates that are attempting to rise to the top portion of the fracture. This mutual interference between the low-density particulates and the proppant aggregates results in a more random vertical distribution of the proppant aggregates.

Thus, some embodiments of the present invention provide methods of: providing a carrier fluid having a specific gravity, proppant aggregates having a density higher than that of the treatment fluid, and low-density particulates having a density lower than that of the treatment fluid; combining the carrier fluid, proppant aggregates, and low-density particulates to create a propping fluid; and then placing the propping fluid into a fracture within a subterranean formation wherein the low-density particulates slow the settling of the proppant aggregates.

In some embodiments, the low-density particulates are present in the treatment fluid as a percentage of the combined weight of the low-density particulates and proppant aggregates and range in an amount from a lower limit of about 0.5, 1, 1.5, 2, 2.5, 3, 3.5, 4, 4.5, or 5 to an upper limit of 20, 19, 18, 17, 16, 15, 14, 13, 12, 10, 9.5, 9, 8.5, 8, 7.5, 7, 6.5, 6, 5.5, or 5 percent. The range wherein the percentage of low-density particulates as a percentage of the combined weight of the low-density particulates and proppant aggregates may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

While at least some embodiments described herein relate to methods of using proppants having two ranges of density (i.e., low-density proppants and higher-density proppant aggregates), this is not intended to be limiting. For example, additional proppants (e.g., super-high-density proppants or super-low-density proppants) also may be provided according to one or more embodiments of the present invention.

Use of the methods of the present invention allows for the use of less gelling agent or gelling agent/crosslinking agent in the carrier fluid. This decreases the cost of the treatment and may also reduce damage to the formation.

According to some embodiments of the present invention, a fracture may be created and/or extended by any suitable means. Such means are well-known to those skilled in the relevant art. For example, in some embodiments, a pre-pad or pad fluid may be injected to initiate the fracturing of a subterranean formation prior to the injection of proppants (i.e., high-density proppants and low-density proppants). In such embodiments, the pre-pad or pad fluid may be proppant-free or substantially proppant-free. In other embodiments, the proppants may be suspended in a slurry which may be injected into the subterranean formation to create and/or extend at least one fracture. In order to create and/or extend a fracture, a fluid is typically injected into the subterranean formation at a rate sufficient to generate a pressure above the fracture gradient.

The proppants may be placed within a fracture by any number of ways. In some embodiments, proppants may be suspended in a treatment fluid that may then be used to transport the proppants to the fracture. The carrier fluid has a density that falls between the density of the high-density proppants and the low-density proppants. The exact density value may not be important as long as the high-density aggregates and the low-density proppants have sufficiently different densities.

A. Carrier Fluids

Any suitable carrier fluid that may be employed in subterranean operations may be used in accordance with the present invention, including aqueous gels, oil-based fluids, viscoelastic surfactant gels, and emulsions. Where desirable, the selected carrier fluid may be foamed by the addition of a gas, such as carbon dioxide or nitrogen.

Suitable aqueous gels are generally comprised of water and one or more gelling agents. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but are not limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof. In some embodiments of the present invention, the carrier fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, carrier fluid, inter alia, reduces fluid loss and allows the carrier fluid to transport proppants.

Suitable oil-based fluids may include alkanes, olefins, aromatic organic compounds, cyclic alkanes, paraffins, diesel fluids, mineral oils, desulfurized hydrogenated kerosenes, and any combination thereof. Suitable emulsions can be comprised of two immiscible liquids such as an aqueous liquid or gelled liquid and a hydrocarbon.

Suitable viscoelastic surfactant gels include an aqueous base fluid and a suitable surfactant that is capable of imparting viscoelastic properties to an aqueous fluid. Example of suitable surfactants can be found in U.S. Pat. No. 8,012,914, the entire disclosure of which is hereby incorporated by reference. The surfactants may be zwitterionic, cationic, anionic, or amphoteric in nature, and comprise any number of different compounds, including methyl ester sulfonates (as described in U.S. Pat. Nos. 7,159,659, 7,303,019, 7,312,634 and U.S. Patent Publication Nos. 2006/0183646, the entire disclosures of which are hereby incorporated by reference), betaines, modified betaines, sulfosuccinates, taurates, amine oxides, ethoxylated fatty amines, quaternary ammonium compounds, derivatives thereof, and combinations thereof. The term "derivative" is defined herein to include any compound that is by, for example, by replacing one atom in one of the listed compounds with another atom or group of atoms, ionizing one of the listed compounds, or creating a salt of one of the listed compounds. The surfactant should be present in a surfactant gel of the present invention in an amount sufficient to provide the desired viscosity (e.g., sufficient viscosity to divert flow, reduce fluid loss, suspend particulates, etc.) therein through formation of viscosifying micelles. In certain embodiments, the surfactant may be present in an amount in the range of from about 0.1% to about 20% (or from 2% to 10%) by volume of the surfactant gel.

Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset there between. Examples of suitable invert emulsions include those disclosed in U.S. Pat. Nos. 5,905,061, 5,977,031, 6,828,279, 7,534,745, 7,645,723, and 7,696,131, each of which are incorporated herein by reference. It should be noted that for water-in-oil and oil-in-water emulsions, any mixture of the above may be used including the water being and/or comprising an aqueous-miscible fluid In some embodiments, the density of the carrier fluid ranges from about 0.75 g/cm$^3$ to about 1.25 g/cm$^3$. In some embodiments, the density of the carrier fluid ranges from about 0.85 g/cm$^3$ to about 1.15 g/cm$^3$. In some embodiments, the density of the carrier fluid ranges from about 0.95 g/cm$^3$ to about 1.10 g/cm$^3$.

B. Proppant Aggregates

In certain embodiments, the treatment fluids of the present invention may comprise a plurality of proppant aggregates. Particulates suitable for use in creating the aggregates are any material suitable for use in subterranean operations as proppant. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh.

In order to form the particles into aggregates, the particles may be agglomerated into suitably sized forms using a consolidating agent. Suitable consolidating agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, and binders. Combinations and/or derivatives of these also may be suitable. Nonlimiting examples of suitable non-aqueous tackifying agents may be found in U.S. Pat. Nos. 7,392, 847, 7,350,579, 5,853,048; 5,839,510; and 5,833,000, the entire disclosures of which are herein incorporated by reference. Nonlimiting examples of suitable aqueous tackifying agents may be found in U.S. Pat. Nos. 8,076,271, 7,131,491, 5,249,627 and 4,670,501, the entire disclosures of which are herein incorporated by reference. Nonlimiting examples of suitable crosslinkable aqueous polymer compositions may be found in U.S. Patent Application Publication Nos. 2010/0160187 and U.S. Pat. No. 8,136,595 the entire disclosures of which are herein incorporated by reference. Nonlimiting examples of suitable silyl-modified polyamide compounds may be found in U.S. Pat. No. 6,439,309 entitled the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. and 2008/0006405 and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0179281, and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

It is within the ability of one skilled in the art, with the benefit of this disclosure, to determine the type and amount of consolidating agent to include in the methods of the present invention to achieve the desired results.

In other embodiments, the proppant aggregates may be formed by placing particles as described above into gel bodies. Gel bodies suitable for use in the present invention include those described in U.S. Pat. No. 7,931,084, the entire disclosure of which is hereby incorporated by reference. In addition, the superabsorbent polymer discussed in U.S. Patent Application Publication No. 2011/0067868, the relevant discussion of which is hereby incorporated by reference, may also be suitable for use as gel bodies in the present invention. One of skill in the art will recognize that some of the gel bodies may be designed to degrade once the fracture closes, while other gel bodies may be more resistant to such degradation long after the closing of the fracture.

By way of example, gel bodies of the present invention may be formed from swellable polymers. Preferably, the swellable polymers is an organic material such as a polymer or a salt of a polymeric material. Typical examples of polymeric materials include, but are not limited to, cross-linked polyacrylamide, cross-linked polyacrylate, cross-linked copolymers of acrylamide and acrylate monomers, starch grafted with acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, and any combination thereof in any proportion. Typical examples of suitable salts of polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. The specific features of the swellable particulate may be chosen or modified to provide a proppant pack or matrix with desired permeability while maintaining adequate propping and filtering capability. These swellable particulates are capable of swelling upon contact with a swelling agent. The swelling agent for the swellable particulate can be any agent that causes the swellable particulate to swell via absorption of the swelling agent. In a preferred embodiment, the swellable particulate is "water swellable," meaning that the swelling agent is water. Suitable sources of water for use as the swelling agent include, but are not limited to, fresh water, brackish water, sea water, brine, and any combination thereof in any proportion. In another embodiment of the invention, the swellable particulate is "oil swellable," meaning that the swelling agent for the swellable particulate is an organic fluid. Examples of organic swelling agents include, but are not limited to, diesel, kerosene, crude oil, and any combination thereof in any proportion. Also by way of example, degradable gel bodies of the present invention may be formed from super-absorbent polymers. Suitable such superabsorbent polymers include polyacrylamide, crosslinked poly(meth)acrylate, and non-soluble acrylic polymers.

Regardless of how formed, the proppant aggregates of the present invention generally have an average density of about 1.10 $g/cm^3$ or greater. In some embodiments, the average density of proppant aggregates is 1.20 $g/cm^3$ or greater. In some embodiments, the average density of proppant aggregates is 1.30 $g/cm^3$ or greater. The exact value of average density may depend on a number of factors including, but not limited to, the carrier fluid used, the number of different proppants used, and the like. In some embodiments, the proppant aggregates may have a relatively narrow distribution of density. In other embodiments, the proppant aggregates may have a relatively wide distribution of density. As used herein, the term "density" refers to the measure of the amount of mass per volume of a particular substance.

C. Low-Density Particulates

The present invention provides low-density particulates and proppant aggregates that tend to have higher densities. As used herein, the term "low-density particulates" generally refers to proppants having an average density of about 0.95 g/cm³ or less. In some embodiments, the average density of low-density proppants is 0.85 g/cm³ or less. In some embodiments, the average density of low-density proppants is 0.75 g/cm³ or less. The exact value of average density may depend on a number of factors including, but not limited to, the carrier fluid used, the number of different proppants used, and the like. In some embodiments, the low-density particulates may have a relatively narrow distribution of specific gravities. In other embodiments, the low-density particulates may have a relatively wide distribution of specific gravities.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration.

The low-density particulates of the present invention may comprise micro-particles selected from fly ash, carbon powder, carbon black, glass bubbles, glass spheres and fiberglass combined with a binder to form a particulate. The binder used to form the micro-particles into particulates can be any of the consolidating agents listed above, such as non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, and binders.

In other embodiments, the low-density particulates of the present invention may comprise any of the traditional proppant particulate materials listed above, so long as the density is correctly selected.

In still other embodiments, the low-density particulates of the present invention may comprise thermoplastic beads prepared from polystyrenedivinylbenzine (SVDB), polyamide imides, nylon 6, polyamide 66, acrylic, polyphenylene oxide, a blend of polyphenylene oxide and nylon 6/6, acrylonitrile butadiene styrene (ABS), ethylene vinyl alcohol, polycarbonate/PET polyester blend, polyethylene terephthalate (PET), unreinforced polycarbonate/polybutylene terephthalate (PC/PBT) blend, polyethylene terephtalate glycol-modified copolymer, polyetherimide polyphenylene ether, molded polyphenylene sulfide (PPS), polyvinylbenzene, acronitrile-butadiene-styrene copolymers, polyvinylchloride, fluoroplastics, polysulfide, polypropylene, styrene acrlyonitrile, polystyrene, phenylene oxide, polystyrene divinylbenzene, polyfluorocarbons, polyetherketones, polyamide-imides, or any combination thereof.

In some cases it may be desirable for the low-density particulates to be in the form of fibers. The use of fibrous proppant particulates may be desirable in some embodiments of the present invention because, among other things, they may provide a lower rate of settling when slurried into a fluid as is often done to transport proppant particulates to desired locations within subterranean formations.

In some embodiments, it may be desirable to coat the low-density proppant with a tacky consolidating agent as described above for forming particles into aggregates. That it, to coat the low-density particulates with a material selected from: non-aqueous tackifying agents, aqueous tackifying agents, emulsified tackifying agents, silyl-modified polyamide compounds, non-hardening resins, crosslinkable aqueous polymer compositions, polymerizable organic monomer compositions, consolidating agent emulsions, zeta-potential modifying aggregating compositions, and a binder.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a carrier fluid having a density;
providing a proppant aggregates having a density higher than that of the carrier fluid;
providing low-density particulates having a density lower than that of the carrier fluid;
combining the carrier fluid, proppant aggregates, and low-density particulates to create a propping fluid;
placing the propping fluid into a fracture within a subterranean formation;
wherein the low-density particulates slow the settling of the proppant aggregates within the fracture.

2. The method of claim 1 wherein the proppant aggregates have a density greater than about 1.10 g/cm³.

3. The method of claim 1 wherein the low-density particulates have a density less than about 0.95 g/cm³.

4. The method of claim 1 wherein the carrier fluid has a density greater than 0.95 g/cm³ and less than 1.10 g/cm³.

5. The method of claim 1 wherein the low-density particulates comprise between about 1% and about 20% of the combined weight of the low-density particulates and the proppant aggregates.

6. The method of claim 1 wherein either the proppant aggregates, the low-density particulates, or both are coated with a consolidating agent.

7. The method of claim 1 wherein the proppant aggregates comprise: proppant material agglomerated with a consolidating agent, proppant material within a gel body, or a combination thereof.

8. The method of claim 1 wherein the low-density particulates are fibrous.

9. The method of claim 1 wherein the low-density particulates comprise: micro-particles combined with a binder, proppant material having a density lower than that of the carrier fluid, thermoplastic beads, or a combination thereof.

10. The method of claim 9 wherein the thermoplastic beads are selected from the group consisting of: polystyrenedivinylbenzine, a polyfluoro carbons, a polyether etherketone, a polyamide imide, nylon 6, polyamide 66, polyphenylene oxide, a blend of polyphenylene oxide and nylon 6/6, acrylonitrile butadiene styrene, ethylene vinyl alcohol, polycarbonate/polyethylene terephthalate polyester blend, polyethylene terephthalate, unreinforced polycarbonate/polybutylene terephthalate blend, polyethylene terephtalate glycol-modified copolymer, polyetherimide polyphenylene ether, molded polyphenylene sulfide, polyvinylbenzene, an acronitrile-butadiene-styrene copolymer, polyvinylchloride, a flouroplastic, polysulfide, polypropylene, styrene acrlyonitrile, polystyrene, phenylene oxide, polystyrene divinylbenzene, a polyflourocarbon, polyetherketones, a polyamide-imide, and any combination thereof.

11. A method comprising:
providing a carrier fluid having a density between about 0.75 g/cm$^3$ and 1.25 g/cm$^3$;
providing a proppant aggregates having a density above 1.1 g/cm$^3$;
providing low-density particulates having a density below 0.95 g/cm$^3$;
combining the carrier fluid, proppant aggregates, and low-density particulates to create a propping fluid;
placing the propping fluid into a fracture within a subterranean formation;
wherein the low-density particulates slow the settling of the proppant aggregates within the fracture by way of mutual interference.

12. The method of claim 11 wherein the low-density particulates comprise between about 1% and about 20% of the combined weight of the low-density particulates and the proppant aggregates.

13. The method of claim 11 wherein either the proppant aggregates, the low-density particulates, or both are coated with a consolidating agent.

14. The method of claim 11 wherein the proppant aggregates comprise: proppant material agglomerated with a consolidating agent, proppant material within a gel body, or a combination thereof.

15. The method of claim 11 wherein the low-density particulates are fibrous.

16. The method of claim 11 wherein the low-density particulates comprise: micro-particles combined with a binder, proppant material having a density lower than that of the carrier fluid, thermoplastic beads, or a combination thereof.

17. The method of claim 16 wherein the thermoplastic beads are selected from the group consisting of: polystyrenedivinylbenzine, a polyfluoro carbons, a polyether etherketone, a polyamide imide, nylon 6, polyamide 66, polyphenylene oxide, a blend of polyphenylene oxide and nylon 6/6, acrylonitrile butadiene styrene, ethylene vinyl alcohol, polycarbonate/polyethylene terephthalate polyester blend, polyethylene terephthalate, unreinforced polycarbonate/polybutylene terephthalate blend, polyethylene terephtalate glycol-modified copolymer, polyetherimide polyphenylene ether, molded polyphenylene sulfide, polyvinylbenzene, an acronitrile-butadiene-styrene copolymer, polyvinylchloride, a flouroplastic, polysulfide, polypropylene, styrene acrlyonitrile, polystyrene, phenylene oxide, polystyrene divinylbenzene, a polyflourocarbon, polyetherketones, a polyamide-imide, and any combination thereof.

* * * * *